UNITED STATES PATENT OFFICE.

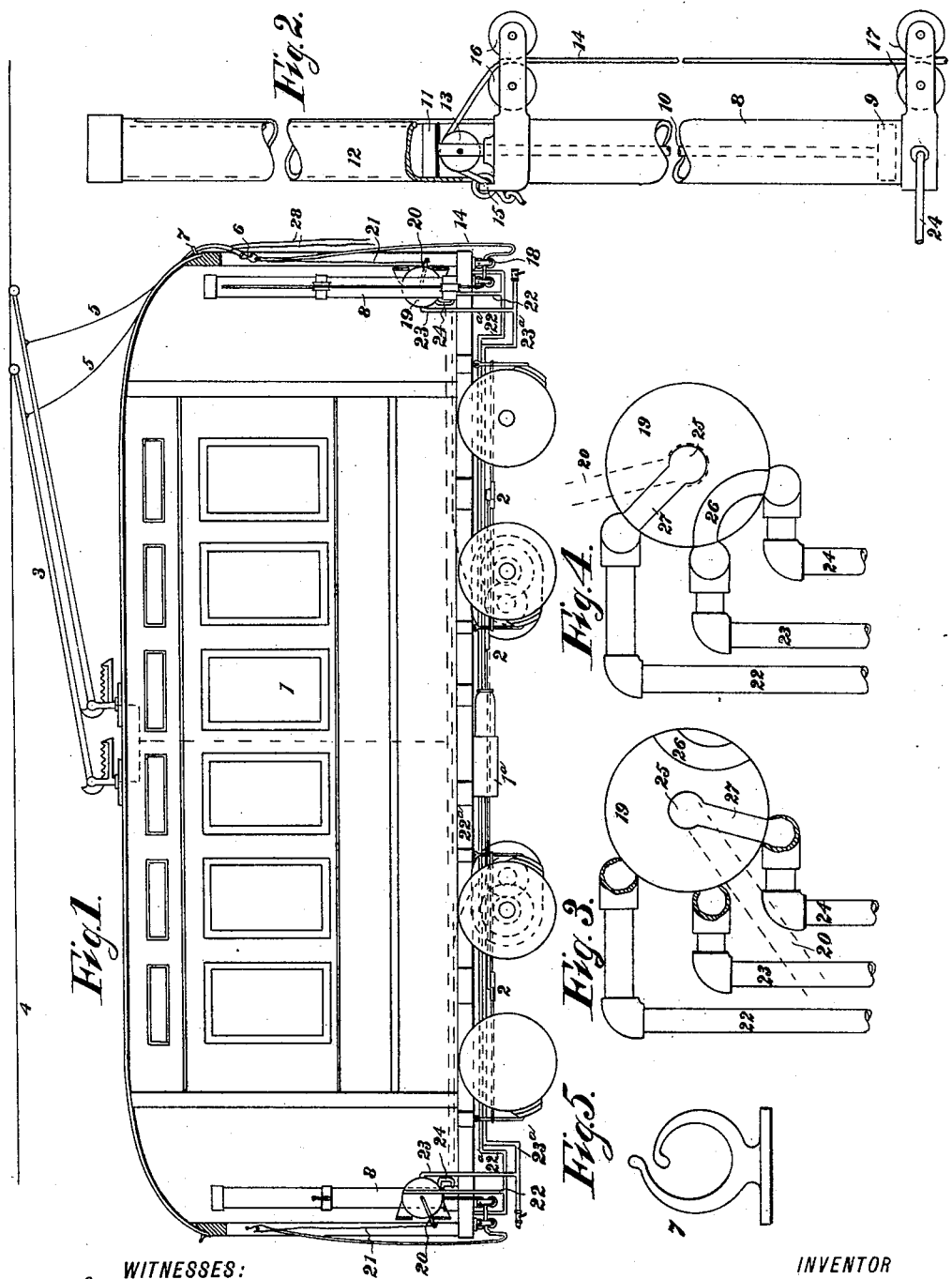

PHILIP R. SALBERG, OF PITTSBURG, PENNSYLVANIA, ASSIGNOR TO THE WESTINGHOUSE ELECTRIC AND MANUFACTURING COMPANY, OF PENNSYLVANIA.

ELECTRICALLY-PROPELLED VEHICLE.

SPECIFICATION forming part of Letters Patent No. 599,947, dated March 1, 1898.

Application filed February 5, 1896. Serial No. 578,151. (No model.)

*To all whom it may concern:*

Be it known that I, PHILIP R. SALBERG, a citizen of the United States, residing in Pittsburg, in the county of Allegheny and State of Pennsylvania, have invented a new and useful Improvement in Electrically-Propelled Vehicles, (Case No. 682,) of which the following is a specification.

My invention relates to electrically-propelled vehicles, and has particular reference to mechanism for operating and controlling railway-cars intended for heavy traffic and to be run at high speeds.

One of the objects of my invention is to provide a current-collecting means which will convey a large volume of current and which will insure a good electrical contact with the supply-conductor at all times, even though there may be irregularities or defects in such conductor.

A further object of my invention is to provide means for pulling down the trolley when the same leaves the supply-conductor and at the same time applying the brakes to the wheels of the car, such means being controlled or set in operation by the upward movement of the trolley above the supply-conductor.

It is apparent that railway-cars intended for the carrying of heavy loads and for running at high speeds must be supplied with such current-collecting devices as will supply a large volume of current to the motors, and when the current for the motors is derived from an overhead conductor by means of underrunning trolleys which are upwardly spring-pressed against such conductor, as is usual in electric railways, it sometimes happens that the trolley becomes disconnected from the conductor and flies upward under the action of the spring, which normally holds it in proper contact. Under such circumstances it is necessary that the brake should be quickly applied in order that proper control of the car may be had, and it is also necessary to instantly pull down the trolley in order to replace it in contact with the supply-conductor and also to avoid injury to the supply-conductor-supporting devices. I propose to insure a good contact and the proper supply of current by providing each car with a plurality of trolleys each of which is independently movable, but all of which are electrically connected in parallel with the motor or motors and controlling apparatus carried by the car.

In cases where the cars are equipped with air-brake mechanism I propose to effect the pulling down of the trolley or trolleys and the application of the brakes simultaneously by means of the fluid-pressure apparatus, a controlling-valve being employed which is actuated in the proper direction to set the necessary apparatus in operation by the upward movement of either of the trolleys above the supply-conductor, suitable connections being made between the trolleys and the valve-lever.

In the accompanying drawings, Figure 1 is an outline view, partially in side elevation and partially in section, of a railway-car equipped with my improvements. Fig. 2 is a detail view of a portion of the trolley pull-down apparatus on an enlarged scale, parts being broken away. Fig. 3 is a view of the controlling-valve and portions of the connecting-pipes, the valve-lever being shown in its down position; and Fig. 4 is a corresponding view showing the valve-lever in its up position. Fig. 5 is a detail view of the trolley-rope guide.

Referring to the drawings in detail, 1 is the car, 1ª the main compressed-air reservoir, and 2 the air-brake mechanism, all of which may be of usual construction.

3 are trolleys, also of usual construction, two of these devices being shown in the drawings. While I consider that two will be a sufficient number in most cases, my invention is not limited to this or any other particular number. These trolleys have the usual mountings and connections, whereby they are reversible in position and are upwardly spring-pressed, so that the trolley-wheels will bear against the supply-conductor 4. These trolleys are connected in parallel to the main circuit of the cars supplying the controlling apparatus and motors, as indicated generally by the dotted lines in Fig. 1. The object of this combination and arrangement, as has already been stated, is twofold—viz., to insure a sufficient contact-surface to supply the necessary volume of current to the large motors necessary for heavy traction and high speed and also to insure a good contact with the supply-conductor at all times, if it should happen that there is some defect or irregularity in such supply-conductor, so that a single trolley would fail to make good electrical contact. Each of the trolleys is provided with a pull-down cord or rope 5, both of such ropes or cords being connected to a snap-hook 6 and passing through a guide 7. This guide 7 is so constructed, as indicated in Fig. 5, that the ropes will be normally retained therein and guided thereby, but may be readily removed therefrom when necessary or desirable. Mounted at or near each end of the car is a vertical cylinder 8, in which is a piston 9. Extending upwardly from the piston 9 is a piston-rod 10, which carries at its upper end a guide-piston 11. This guide-piston loosely fits a tubular guide 12, which extends above the cylinder 8 and is in alinement therewith.

Mounted upon the upper end of the piston-rod 10, just below the guide-piston 11, is a pulley 13. A cord 14 is fastened to an eye 15 or some other suitable stationary device, and such cord passes over the pulley 13, between a pair of stationary guide-pulleys 16 at the top of the cylinder 8, and extends downwardly and between another pair of guiding-pulleys 17 at the bottom of the cylinder between other guide-pulleys 18, supported upon the bottom of the car, and thence to the snap-hook 6, from which it is supported by means of a suitable eye or loop.

19 is the controlling-valve, provided with a valve arm or lever 20, to which is connected one end of a cord 21, the other end of this cord being attached to the snap-hook 6. When the valve-lever 20 is in its lowest position, as indicated in Figs. 1 and 3, the pipe 22, leading to the train-pipe 22$^a$, and the pipe 23, leading to the main reservoir-pipe 23$^a$, are closed, and the pipe 24, leading to the cylinder 8, is in communication with the exhaust 25 through the passage 27. When the valve is in this position, the piston 9 will be at the bottom of the cylinder 8, as indicated in Figs. 1 and 2, and the cord 14 will be sufficiently slack, so that the upward movement of either of the trolleys, if it leaves the supply-conductor, may be sufficient to move the valve 20 into the position indicated in Fig. 4, when the train-pipe 22$^a$ will be put into communication with the exhaust 25 by means of the pipe 22 and passage 27, and the main reservoir will be connected by means of the pipes 23, 23$^a$, and 24 and the passage 26 with the cylinder 8. The connection of the train-pipe 22$^a$ with the exhaust will effect the immediate application of the brakes, as will be readily understood, and the connection of the pipes 23, 23$^a$, and 24 with the cylinder 8 will permit the entrance of air from the main reservoir into the cylinder and quickly move the piston 9 upward, thus pulling down the trolley or trolleys by means of the cords 5 and 14. After the trolleys are thus pulled down below the supply-conductor they must be replaced in contact with the conductor by hand. This may be readily done by removing the cords 5 from the guide 7 and moving the trolleys laterally by means of the cords 5 and the hand-ropes 28. In order to release the brakes and permit the descent of the piston 9, the valve must be returned to its original position by depressing the lever or handle 20 by hand. When this is done, the pistons 9 and 11 will descend by gravity.

While I have shown and described certain specific details of construction which may be conveniently employed for practicing my invention, I desire it to be understood that the details may be considerably varied from those shown without departing from the spirit and scope of the invention.

I claim as my invention—

1. In an electrically-propelled vehicle, the combination with a trolley and means for pressing the same upwardly against the supply-conductor, of mechanism for pulling down the trolley when it leaves the conductor, said mechanism comprising a cylinder, a piston, a cord between said piston and the trolley, a controlling-valve and a cord between said valve and the trolley whereby an upward movement of the trolley above the conductor actuates said valve to admit compressed air into said cylinder.

2. The combination with an electrically-propelled vehicle provided with an overhead trolley, of means for simultaneously applying the brakes and pulling down the trolley when the latter leaves the supply-conductor, said means being controlled by the upward movement of the trolley above the conductor.

3. The combination with an electrically-propelled car having one or more upwardly-spring-pressed trolleys, of a reservoir for compressed air, a cylinder, a valve and connections between the same and the reservoir, a lever for said valve, a piston in said cylinder and cords connecting said trolley or trolleys with said valve-lever and with said piston, whereby any upward movement of the trolley above the supply-conductor will actuate the valve to effect the movement of the piston and the pulling down of the trolley.

4. The combination with an electrically-propelled car having a trolley and means for pressing the same upwardly, of compressed-air mechanism and connections between the same and the trolley whereby the upward movement of the trolley above the supply-conductor will actuate said compressed-air mechanism to pull down the trolley and apply the brake.

5. In an electrically-propelled car, the combination with an overhead trolley, a cylinder having a piston actuated by fluid-pressure, a source of supply for said fluid-pressure, and a controlling-valve, of a cord connecting said valve with said trolley whereby an upward movement of the trolley above the supply-conductor actuates said valve to put the cylinder in communication with the source of fluid-pressure.

6. The combination with an electrically-propelled car provided with an overhead trolley, of a fluid-pressure brake and valve mechanism and means intermediate the same and the trolley whereby the upward movement of the latter above the supply-conductor effects the application of the brake and the pulling down of the trolley.

7. The combination with an electrically-propelled car provided with an overhead trolley, of a fluid-pressure brake and valve mechanism, and means actuated by the upward movement of the trolley above the supply-conductor whereby the valve is moved to effect the application of the brakes.

In testimony whereof I have hereunto subscribed my name this 18th day of January, A. D. 1896.

PHILIP R. SALBERG.

Witnesses:
W. H. OLIPHANT,
JOHN D. CLEVENGER.